UNITED STATES PATENT OFFICE.

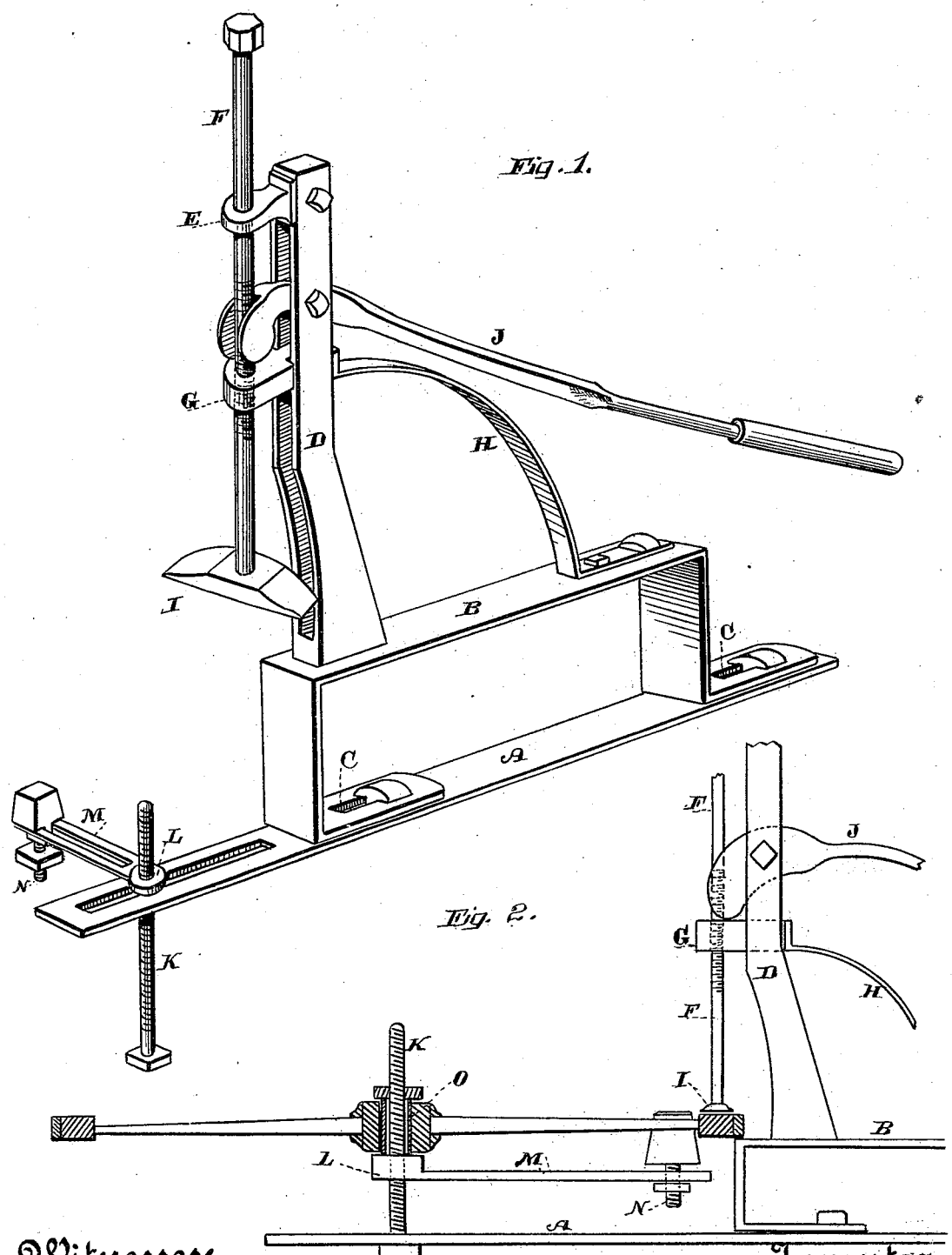

FRANCIS WINNE, OF ORLAND, CALIFORNIA.

TIRE-SETTER.

SPECIFICATION forming part of Letters Patent No. 275,967, dated April 17, 1883.

Application filed July 3, 1882. (No model.)

*To all whom it may concern:*

Be it known that I, FRANCIS WINNE, of Orland, county of Colusa, State of California, have invented a Press for Setting or Removing Tires from Wheels; and I hereby declare the following to be a full, clear, and exact description thereof.

My invention relates to an apparatus to be used for removing tires from vehicle-wheels and replacing them in the proper positions; and it consists of a frame which may be secured to a bench or table or otherwise supported, and which carries an adjustable spindle and sleeve, upon which the wheel is supported, so that its rims may be brought beneath a presser-foot, which is forced down by a lever or other power. The edge of the tire rests upon a support, so that the wheel-felly may be forced out by the pressure.

Referring to the accompanying drawings for a more complete explanation of my invention, Figure 1 is a view of my apparatus. Fig. 2 shows the application thereof.

A is a plate, which may be supported in any suitable manner. Upon this plate the frame B is fixed by bolts which pass through slots C in the plate or frame, and thus allow the frame to be moved forward or backward to suit different sizes of wheels. Upon the top of this frame is a standard, D, having a guide, E, at its top, through which the rod or stem F slides. A second guide, G, is fixed to the end of a spring-arm, H, and is fitted to move up and down in a vertical slot in the standard or to be otherwise guided. This guide G forms a nut, through which the stem F is secured, so that its lower end may be adjusted to any desired height from the edge of the frame B or the table upon which the wheel is to rest. This adjustment is made to accommodate broad or narrow wheels. A plate, I, is fitted to the lower end of the stem so as to turn loosely upon it. This plate has one or both edges curved, so that when the plate rests upon the wheel-felly the edge which lies next to the tire will follow the curve of the outside of the felly, and not project so as to also rest upon the tire.

A lever-arm, J, has its fulcrum upon the standard D and above the movable nut G, and it has a head formed at the short arm or end of the lever, which presses upon the nut when the opposite end of the lever is raised, and thus forces it and the stem F and plate I downward, so that if the edge of the wheel-tire is supported upon the end of the frame B or table, and the plate I is placed upon the felly, the latter will be forced out, and by turning the wheel and applying this pressure to the circumference of the wheel at different points it will be forced out from the tire without hammering or danger of breakage. When the lever J is released the rod and nut are drawn up by the elasticity of the spring H, which may be of any desired form.

In order to hold or adjust the wheel to the proper position to be operated upon, the base-plate A extends out in front of the frame and is slotted to receive a stem or spindle, K. This stem has screw-threads, and passes through a nut, L, which rests upon the plate, and has a slotted arm, M, extending outward from it. Through the slot in this arm a bolt, N, passes, and by a nut below the slot in the plate A the arm M, nut L, and spindle K may be adjusted to any desired point with relation to the frame B, upon which the tire is to rest. The spindle or stem K passes through the hole in the hub of the wheel, and the wheel is fixed upon it by a nut or otherwise. I have shown a sleeve, O, which fits upon the spindle, turning loosely, and this enters the opening through the wheel-hub, so that the wheel may be turned to any point desired. As the stem passes up through the nut L, it may be turned up or down to raise or lower the wheel so that its tire will rest properly upon the point of support.

The bolt N, which secures the slotted arm M, may have its top enlarged and formed into an anvil, upon which the riveting may take place after the tire has been replaced without removing it from the stem.

This apparatus is especially useful in removing and replacing the tires of header-wagon wheels and other heavy wheels. These tires are usually secured by bolts or rivets, which pass through holes transversely beneath the tire, and have heads sufficiently broad to prevent the tire from coming off. When the tires must be reset from the shrinking of the wheels in hot dry weather or from other causes, they are usually driven off by blows of a hammer, and as the wood becomes brittle the fellies are often broken by the blows. By my apparatus the tire may be forced off by a gradual pressure without injuring the wood-work. When the tires are replaced it is not necessary to hammer them or get them exactly right when they are first put on, as the wheel may afterward be put under the press and the tire adjusted exactly. The wheel may then be turned, and as its edge rests upon the anvil N, the rivets can be headed down and the whole work finished without removing the wheel from the spindle.

Having thus described my invention, what I claim as new, and desire to secure by Letters Patent, is—

1. In a device for removing and replacing tires, the pressure-stem F, with its presser-foot I, in combination with the wheel-support consisting of the spindle K, passing through the hub of the wheel and adjustable upon the base-plate A, which also supports the standard of the pressure-stem, substantially as herein described.

2. A device for removing and replacing tires, consisting of the vertically-moving adjustable table or plate A, stem F, and provided with the presser-foot I, and the wheel-supporting spindle K, adjustable to or from the support B, and also adjustable vertically through the nut L, substantially as herein described.

In witness whereof I have hereunto set my hand.

FRANCIS WINNE.

Witnesses:
S. H. NOURSE,
G. W. EMERSON.